Patented May 18, 1943

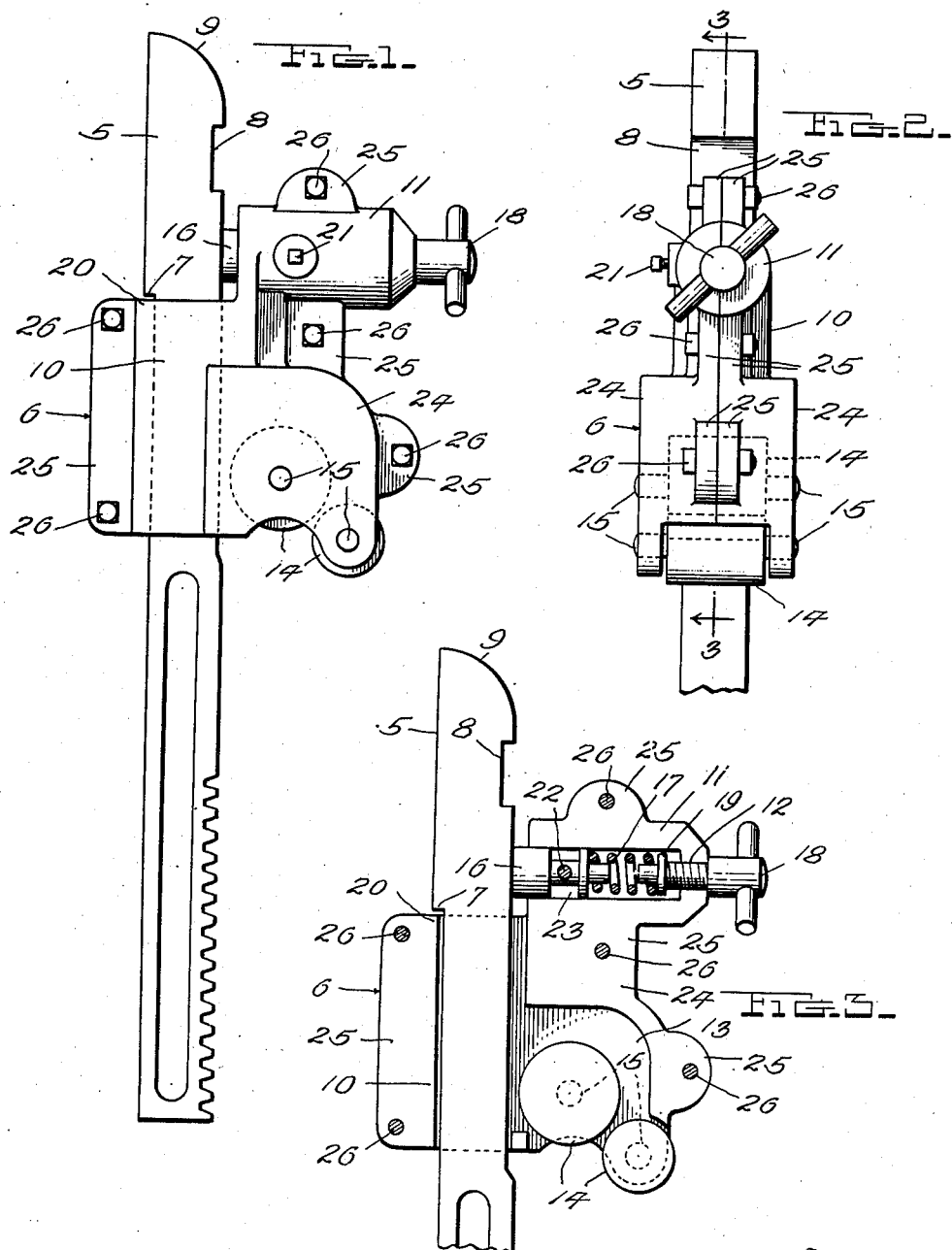

2,319,553

UNITED STATES PATENT OFFICE 2,319,553

CALENDER RACK

Frank M. Morton, Phenix City, Ala., assignor to Morton Machine Works, Columbus, Ga.

Application April 28, 1942, Serial No. 440,863

1 Claim. (Cl. 19—162)

The invention relates to calender racks of the type in which a head carrying lap pin rollers is slidably mounted upon a vertical rack bar and is normally held in engagement with a downwardly facing shoulder on said bar by means of a spring-pressed pin, which pin permits the head to cant under undue strain until it disengages from the shoulder of the rack bar, whereupon said head may slide upwardly to relieve the strain and prevent breakage of parts. Calender racks of this general type are disclosed in U. S. Patents 1,495,920 of May 27, 1924, and 1,627,988 of May 10, 1927, both issued to F. M. Morton.

It is the object of the present invention to simplify and improve upon the constructions shown by the patents above mentioned, providing a structure which may be more advantageously manufactured and marketed, and one which will be more desirable in use.

With the foregoing in view, the invention resides in the novel subject matter hereinafter described and claimed, description being accomplished by reference to the accompanying drawing.

Fig. 1 is a side elevation.

Fig. 2 is an edge view.

Fig. 3 is a vertical sectional view substantially on line 3—3 of Fig. 2.

The rack bar is shown at 5 and the vertically slidable head at 6. One edge of the rack bar 5 is provided near its upper end with an integral downwardly facing shoulder 7, and the other edge of said rack bar is provided with a notch 8 and with an integral downwardly facing shoulder forming the upper end wall of said notch and located above said shoulder. From the upper wall of this notch to the opposite edge of the rack bar 5, the upper end of this rack bar is preferably beveled as at 9 to facilitate engagement of the head 6 with said rack bar.

The head 6 includes a vertical hollow bearing portion 10 to receive the rack bar 5, and a horizontal hollow bearing portion 11 above and at one side of said bearing portion 10, said horizontal bearing portion 11 being formed with an opening 12 at its outer end and extending from the interior to the exterior of said bearing portion. The lower portion of the head 6 is formed with a recess 13 which opens downwardly and receives the lap pin bearing rollers 14, the trunnions 15 of which are rotatable in openings in the opposite side walls of said head. The horizontal bearing portion 11 receives a plunger 16, and a compression spring 17 for projecting said plunger. The inner end of a screw 18 is threaded through the opening 12 and abuts a headed thrust pin 19 engaging one end of the spring 17, for compressing said spring and holding it under compression, causing the plunger 16 to yieldably press against the notched edge of the rack bar 5, thus holding the upper end 20 of the vertical bearing portion 10 against the downwardly facing shoulder 7 of said rack bar, the spring and plunger, however, being yieldable when the lap pin exerts excessive upward pressure on the rollers 14, permitting the head 6 to cant and disengage from the shoulder 7, whereupon said head may slide upwardly to relieve the strain and prevent breakage of parts. When this upward sliding occurs, the plunger 16 snaps into the notch 8, thus preventing the head 6 from being forced entirely from the rack bar and possibly causing injury to the machine attendant.

The parts indicated at 21 (Figs. 1 and 2) and 22 (Fig. 3) are simply the head and the inner end of a stop screw engageable with a wide groove 23 in the plunger 16 to hold this plunger within the horizontal bearing portion 11 prior to engagement of the head 6 with the rack bar 5.

The head 6 is vertically split into two halves 24, the split being in a plane extending through the bearing portions 10 and 11 and the opening 12 and through the recess 13, said halves being provided at appropriate locations with contacting flanges 25 through which bolts 26 pass to tightly secure the two halves 24 of the head together. If desired, these bolts may so tightly clamp the two halves of the upper bearing portion 11 together, as to frictionally lock the screw 18 against vibrating out of adjustment, easy rotation of the screw, however, being permitted by slightly loosening the bolts above and below said bearing portion 11. Thus, the sectional bolted construction of the head not only facilitates manufacture and assembly but allows tight clamping of the screw 18 between the head sections.

From the foregoing taken in connection with the accompanying drawing, it will be seen that novel and advantageous provision has been made for carrying out the object of the invention, and while preferred details have been disclosed, variations may of course be made within the scope of the invention as claimed.

I claim:

In a calender rack, a head split vertically into two sections; said head having a downwardly open recess, a vertical rack bearing, a horizontal bearing at the upper end and to one side of said vertical bearing, and a threaded opening in the outer end of said horizontal bearing; lap pin rollers in said recess, a rack-engaging plunger and a projecting spring therefor both mounted in said horizontal bearing, a screw threaded through said opening for holding said spring compressed, and bolts securing said two head sections together; the split which divides said head into said two sections being located in a plane extending through both of said bearings, through said recess and through said opening; whereby the sectional bolted construction of said head not only facilitates manufacture and assembly but permits clamping of said screw tightly between said head sections.

FRANK M. MORTON.